United States Patent
Wu et al.

(10) Patent No.: US 12,099,730 B2
(45) Date of Patent: Sep. 24, 2024

(54) DATA STORAGE SYSTEM WITH INTELLIGENT POWER MANAGEMENT

(71) Applicant: PROMISE TECHNOLOGY, INC., Hsinchu County (TW)

(72) Inventors: Zhi-Yu Wu, Hsinchu County (TW); Cheng-Chou Wang, Hsinchu County (TW); Che-Jen Wang, Hsinchu County (TW)

(73) Assignee: PROMISE TECHNOLOGY, INC., Hsinchu County (TW)

( * ) Notice: Subject to any disclaimer, the term of this patent is extended or adjusted under 35 U.S.C. 154(b) by 0 days.

(21) Appl. No.: 18/321,893

(22) Filed: May 23, 2023

(65) Prior Publication Data
US 2023/0393767 A1     Dec. 7, 2023

(30) Foreign Application Priority Data
Jun. 1, 2022   (TW) .................................. 111120446

(51) Int. Cl.
*G06F 3/06*     (2006.01)
(52) U.S. Cl.
CPC .......... *G06F 3/0625* (2013.01); *G06F 3/0655* (2013.01); *G06F 3/0673* (2013.01)

(58) Field of Classification Search
CPC .... G06F 3/0625; G06F 3/0655; G06F 3/0673; G06F 1/3268; G06F 3/0683; G06F 3/0634; Y02D 10/00
See application file for complete search history.

(56) References Cited

U.S. PATENT DOCUMENTS 9,026,778 B2 *   5/2015   Andou .................. G06F 1/3203
                                                                713/320

\* cited by examiner

*Primary Examiner* — Khoa D Doan
(74) *Attorney, Agent, or Firm* — MUNCY, GEISSLER, OLDS & LOWE, P.C

(57) ABSTRACT

A data storage system with intelligent power management includes a plurality of data storage devices and a controller. Each data storage device is capable of operating in one of (N+1) power saving functions where N is an integer larger than 1. The (N+1) power saving functions sequentially correspond to from the 0th to the Nth power saving levels. The controller reads a user-setting power saving level (I) where I is an integer index ranging from 0 to N. The controller reads a current power saving level (J) of a current power saving function of one of the plurality of data storage devices where J is an integer index ranging from 0 to N. The controller controls said one data storage device to operate in one power saving function among the (N+1) power saving functions according to the user-setting power saving level (I) and the current power saving level (J).

5 Claims, 4 Drawing Sheets

DATA STORAGE SYSTEM WITH INTELLIGENT POWER MANAGEMENT

CROSS-REFERENCE TO RELATED APPLICATION

This utility application claims priority to Taiwan Application Serial Number 111120446, filed Jun. 1, 2022, which is incorporated herein by reference.

BACKGROUND OF THE INVENTION

1. Field of the Invention

The invention relates to a data storage system, and more in particular, to a data storage system with intelligent power management.

2. Description of the Prior Art

With the rise of cloud applications, many service providers have provided public cloud storage services, such as Amazon's AWS (Amazon Web Service) service, Dropbox's cloud hard disk service, MegaUpload's cloud hard disk service, and so on. Service providers of public cloud storage use a large number of data storage systems to provide services.

In addition, based on the demand for mass storage and in order to ensure data security, the current enterprises and even the general public often use RAID (Redundant Array of Independent Drives) data storage systems or JBOD (Just a Bunch Of Disks) data storage systems to establish DAS (Direct Attached Storage), NAS (Network Attached Storage), SAN (Storage Attachment Network) or SAN/NAS storage architecture in the enterprise intranet or home network. A data storage system includes a plurality of data storage devices (for example, disk drives), which inevitably consume a lot of power.

Although, the current data storage system industry also designs power saving functions for data storage devices. However, if the data storage device is accessed frequently, the performance of data storage and retrieval will be affected when the power saving function is operated. At present, the data storage system using a large number of data storage devices has not yet seen better power management between the data access performance and the reduction of power consumption of the data storage devices.

SUMMARY OF THE INVENTION

Accordingly, one scope of the invention is to provide a data storage system with intelligent power management.

A data storage system with intelligent power management according to a preferred embodiment of the invention includes a plurality of data storage devices and a controller. Each data storage device is capable of operating in one of (N+1) power saving functions, where N is an integer larger than 1. The (N+1) power saving functions sequentially correspond to from the 0th to the Nth power saving levels. The controller is respectively electrically connected to the plurality of data storage devices. The controller performing the steps of: (a) based on a monitoring period, performing a current monitoring on the plurality of data storage devices; (b) reading a setting information associated with a main switch and a user-setting power saving level (I), where I is an integer index ranging from 0 to N; (c) according to the setting information associated with the main switch, judging whether the main switch is turned on; (d) if the judgment in step (c) is YES, judging whether the main switch is turned on under a previous monitoring; (e) if the judgment in step (d) is NO, reading a current power saving level (J) of a current power saving function of one of the plurality of data storage devices, where J is an integer index ranging from 0 to N, the current power saving function is one of the (N+1) power saving functions; (f) judging whether the current power saving level (J) is larger than the user-setting power saving level (I); (g) if the judgment in step (f) is NO, controlling said one data storage device to operate in said one power saving function corresponding to the Ith power saving level; (h) if the judgment in step (f) is YES, controlling said one data storage device to operate in said one power saving function corresponding to the Jth power saving level; and (i) based on the monitoring period, performing a next monitoring on said one data storage device.

In one embodiment, the plurality of data storage devices can be specified in a RAID architecture or a JBOD architecture.

Further, in the data storage system with intelligent power management according to the preferred embodiment of the invention, the controller also performing the steps of: (j) if the judgment in step (c) is NO, reading the current power saving level (J) of the current power saving function of said one data storage device; (k) judging whether the current power saving level (J) is equal to 0; (l) if the judgment in step (k) is YES, preforming step (a); and (m) if the judgment in step (k) is NO, controlling said one data storage device to operate in said one power saving function corresponding to the 0th power saving level and preforming step (a).

Further, in the data storage system with intelligent power management according to the preferred embodiment of the invention, the controller also performing the steps of: (n) if the judgment in step (d) is YES, judging whether the monitoring period of the current monitoring is expired; (o) if the judgment in step (n) is YES, reading the current power saving level (J) of the current power saving function of said one data storage device and performing step (f) through step (i); and (p) if the judgment in step (n) is NO, performing step (a).

In one embodiment, after the controller performs the next monitoring on said one data storage device, the controller performs step (a).

Compared to the prior art, the data storage system with intelligent power management according to of the invention can achieve the best power management between the data access performance and the reduction of power consumption of the data storage devices.

The advantage and spirit of the invention may be understood by the following recitations together with the appended drawings.

BRIEF DESCRIPTION OF THE APPENDED DRAWINGS

DETAILED DESCRIPTION OF THE INVENTION

Some preferred embodiments and practical applications of this present invention would be explained in the following paragraph, describing the characteristics, spirit, and advantages of the invention.

Figure 1:
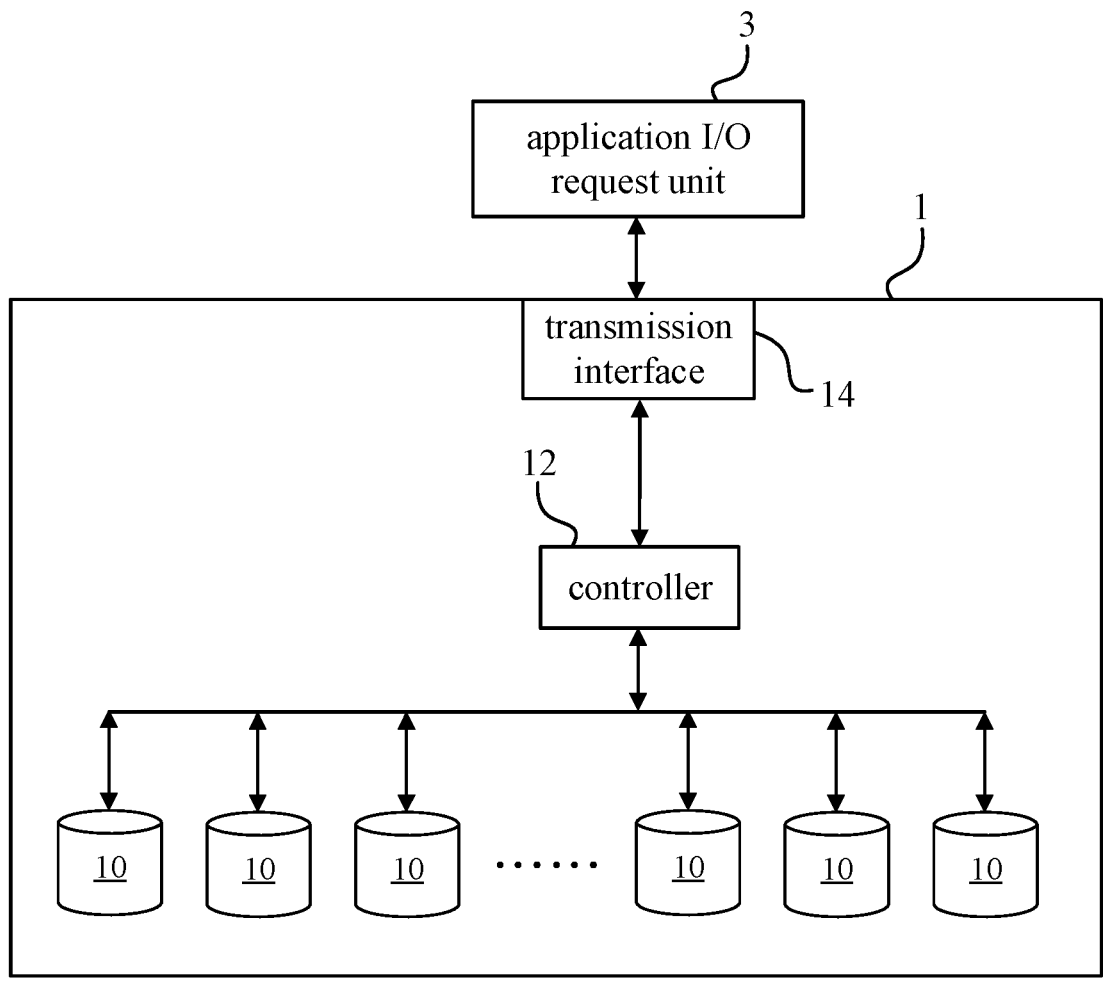
FIG. 1 is a schematic diagram showing the architecture of a data storage system with intelligent power management according to the preferred embodiment of the invention.

Referring to FIG. 1, the architecture of a data storage system 1 with intelligent power management according to the preferred embodiment of the invention is illustratively shown in FIG. 1.

As shown in FIG. 1, the data storage system 1 includes a plurality of data storage devices 10 and a controller 12. Each data storage device 10 is capable of operating in one of (N+1) power saving functions, where N is an integer larger than 1. The (N+1) power saving functions sequentially correspond to from the 0th to the Nth power saving levels. The controller 12 is respectively electrically connected to the plurality of data storage devices 10.

In one embodiment, each of the data storage devices 10 can be a tape drive, a disk drive, a memory device, an optical storage drive, a sector corresponding to a single read-write head in the same disk drive, or other equivalent data storage device.

Referring to Table 1, power saving levels and power consumption ratios of an example, showing that each data storage device 10 of the data storage system 1 according to the invention is capable of operating in one of the (N+1) power saving functions, are listed in Table 1. In the example listed in Table 1, N is equal to 3, that is, each data storage device 10 is capable of operating in one of four power saving functions. The 4 power saving functions sequentially correspond to from the 0th to the 3rd power saving levels. It should be noted that the definition of the above four power saving levels starting from the 0th power saving level is only a technique commonly used in information technology, rather than a limitation of the invention.

TABLE 1

| power saving level | power consumption ratio |
|---|---|
| 0 | 100% |
| 1 | 80% |
| 2 | 60% |
| 3 | 40% |

In one embodiment, the plurality of data storage devices 10 can be specified in a RAID architecture or a JBOD architecture.

Also as shown in FIG. 1, FIG. 1 also illustratively shows an application I/O request unit 3. The data storage system 1 according to the invention also includes a transmission interface 14. The controller 12 is electrically connected to the transmission interface 14. The application I/O request unit 3 is coupled to the controller 12 through a transmission interface 14.

In practical application, the application I/O request unit 3 can be a network computer, a mini-computer, a mainframe, a notebook computer, or any electronic equipment need to read or write data in the data storage system 1 according to the invention, e.g., a cell phone, a personal digital assistant (PDA), a digital recording apparatus, a digital music player, and so on.

When the application I/O request unit 3 is a stand-alone electronic equipment, it can be coupled to the data storage system 1 according to the invention through a transmission interface such as a storage area network (SAN), a local area network (LAN), a serial ATA (SATA) interface, a fiber channel (FC), a small computer system interface (SCSI), and so on, or other I/O interfaces such as a PCI express interface. In addition, when the application I/O request unit 3 is a specific integrated circuit device or other equivalent devices capable of transmitting I/O read or write requests, it can send read or write requests to the controller 12 according to commands (or requests) from other devices, and then read or write data in the data storage devices 10 via the controller 12.

The controller 12 and the data storage devices 10 of the data storage system 1 according to the invention can not only be installed in an enclosure, but also be separately installed in different enclosures. In practice, the controller 12 can be coupled to the data storage devices 10 through a transmission interface such as an FC, a SCSI, a SAS, a SATA, a parallel ATA (PATA, or IDE), and so on. If the data storage devices 10 are disk drives, each of data storage devices 10 can be a disk drive of different interface such as an FC, a SCSI, a SAS, a SATA, a PATA, and so on. The controller 12 can be a RAID controller or a controller capable of generating redundant data for the data storage system 1 according to the invention.

Figure 2:
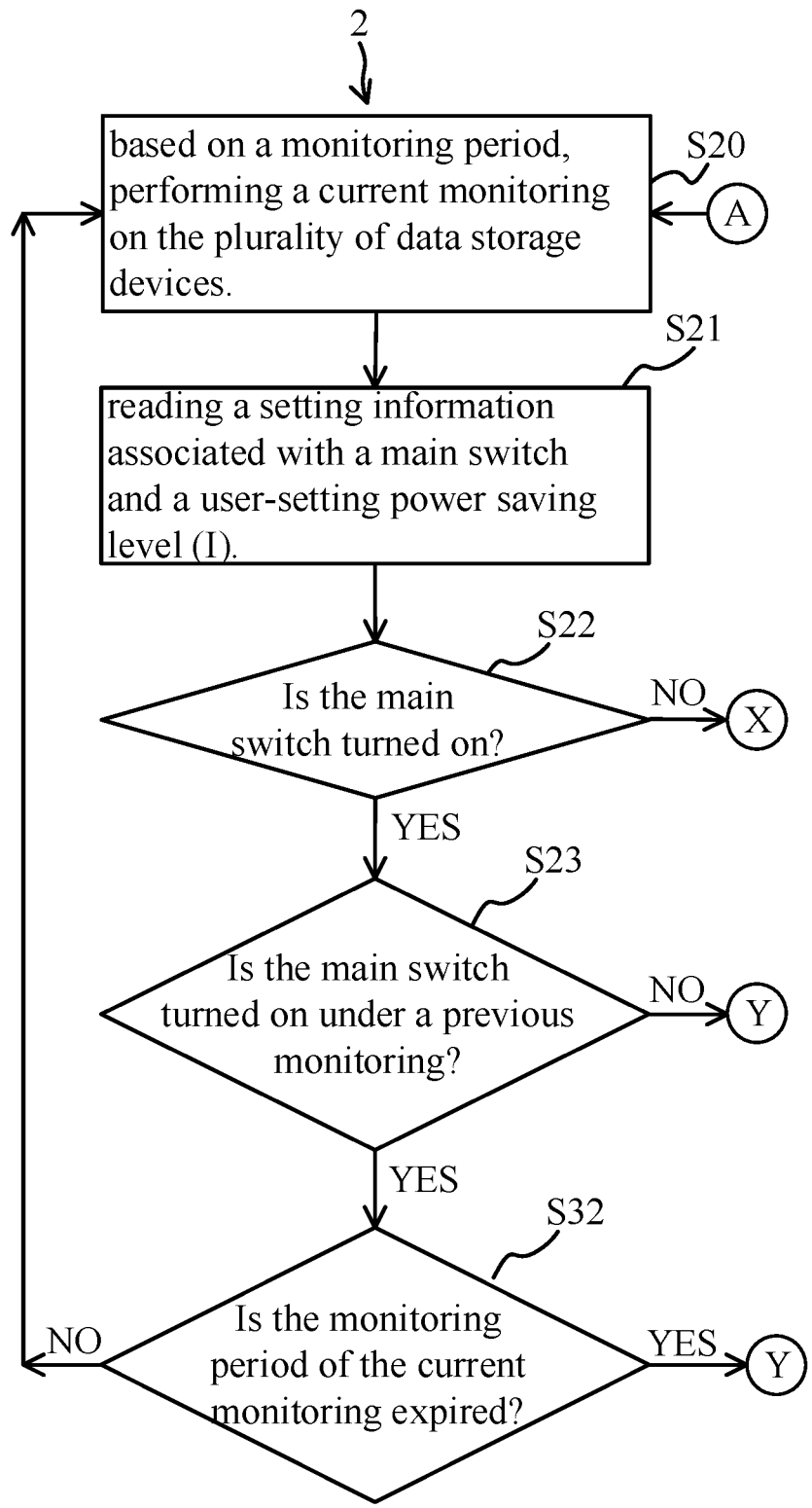
FIG. 2 through FIG. 4 are a flowchart illustrating a power management method performed by a controller, a necessary component of the data storage system with intelligent power management according to the preferred embodiment of the invention.
Figure 3:
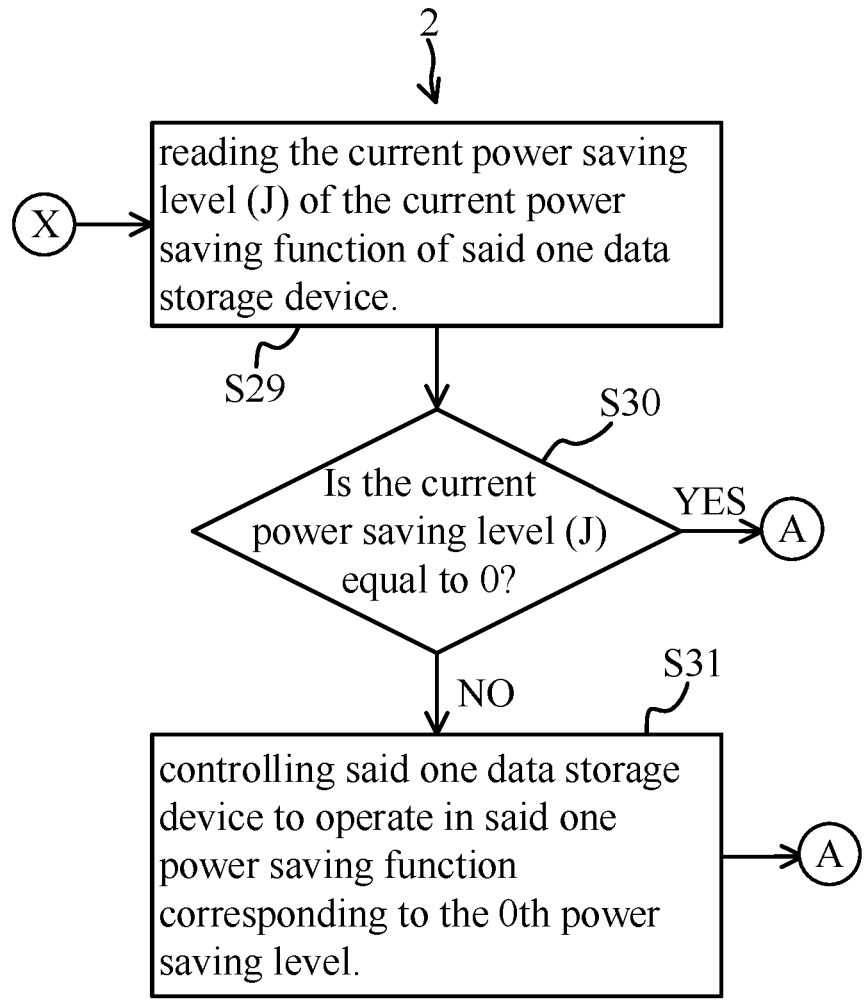
Figure 4:
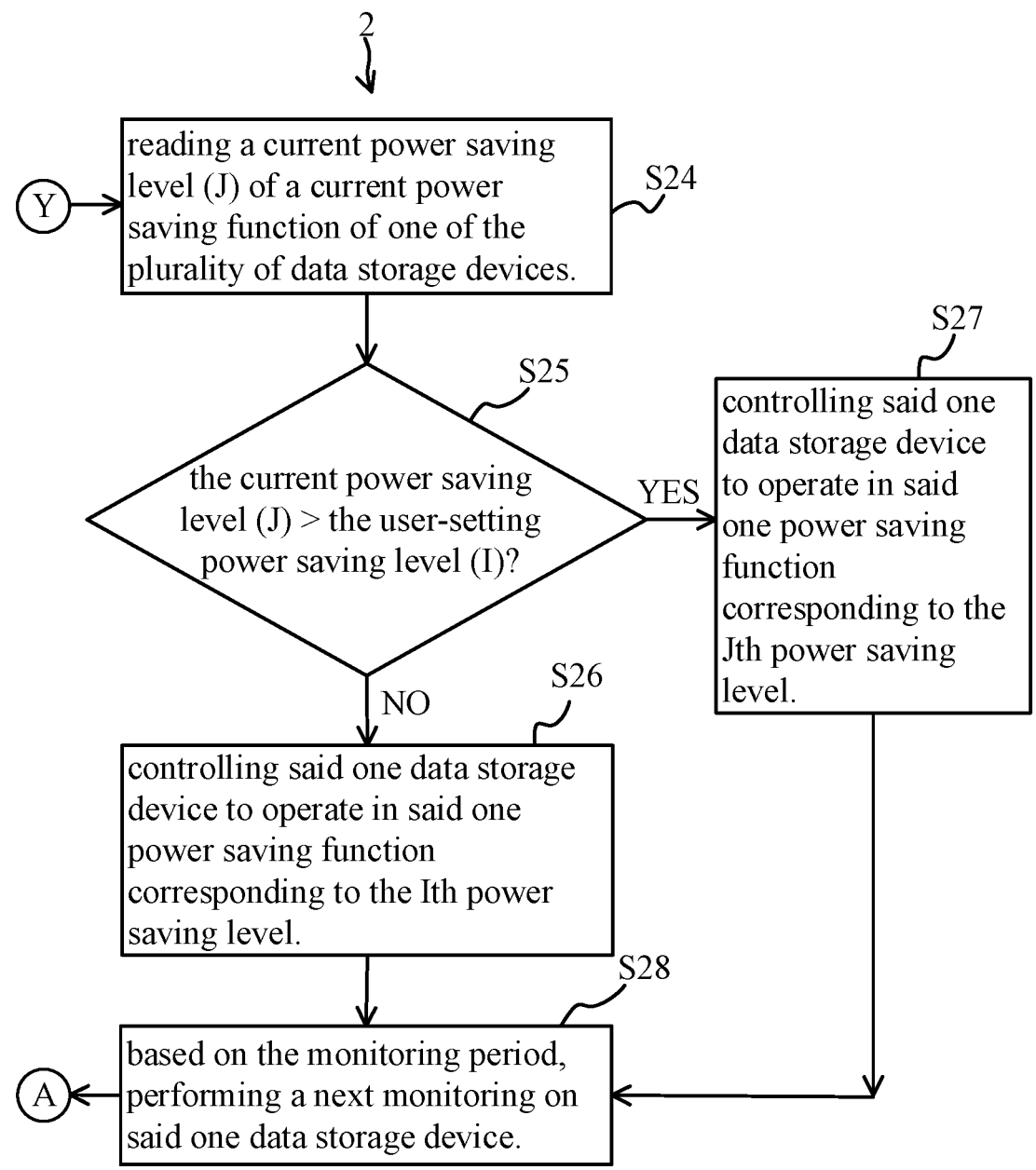

Referring to FIG. 2 through FIG. 4, FIG. 2 through FIG. 4 are a flowchart illustrating a power management method performed by the controller 12.

As shown in FIG. 2 to FIG. 4, firstly, the controller 12 performs step S20 to perform a current monitoring on the plurality of data storage devices 10 on the basis of a monitoring period.

Next, the controller 12 performs step S21 to read a setting information associated with a main switch and a user-setting power saving level (I), where I is an integer index ranging from 0 to N. In one embodiment, The application I/O request unit 3 or the controller 12 can execute an application program to provide a graphical user interface for the user to input the user-setting power saving level (I). It should be noted that, in addition to the built-in user-setting power saving level (I), the data storage system 1 according to the invention also has a built-in setting information associated with the main switch. The steps performed by the controller 12 in response to the main switch being turned on and the steps performed by the controller 12 in response to the main switch being turned off will be described in detail hereinafter.

Afterward, the controller 12 performs step S22 to judge, according to the setting information associated with the main switch, whether the main switch is turned on.

If the judgment in step S22 is YES, the controller 12 performs step S23 to judge whether the main switch is turned on under a previous monitoring.

If the judgment in step S23 is NO, the controller 12 performs step S24 to read a current power saving level (J) of a current power saving function of one of the plurality of data storage devices 10, where J is an integer index ranging from 0 to N, the current power saving function is one of the (N+1) power saving functions.

After step S24, the controller 12 performs step S25 to judge whether the current power saving level (J) is larger than the user-setting power saving level (I).

If the judgment in step S25 is NO, the controller 12 performs step S26 to control said one data storage device 10 to operate in said one power saving function corresponding to the Ith power saving level.

If the judgment in step S25 is YES, the controller 12 performs step S27 to control said one data storage device 10 to operate in said one power saving function corresponding to the Jth power saving level.

Finally, after step S26 and step S27, the controller 12 performs step S28 to perform a next monitoring on said one data storage device 10 on the basis of the monitoring period.

Also as shown in FIG. 2 to FIG. 4, further, if the judgment in step S22 is NO, the controller 12 performs step S29 to read the current power saving level (J) of the current power saving function of said one data storage device 10.

After step S29, the controller 12 performs step S30 to judge whether the current power saving level (J) is equal to 0.

If the judgment in step S30 is YES, the controller 12 performs step S20.

If the judgment in step S30 is NO, the controller 12 performs step S31 to control said one data storage device 10 to operate in said one power saving function corresponding to the 0th power saving level and then to preform step S20.

Also as shown in FIG. 2 to FIG. 4, further, if the judgment in step S23 is YES, the controller 12 performs step S32 to judge whether the monitoring period of the current monitoring is expired.

If the judgment in step S32 is YES, the controller 12 performs step S24 to read the current power saving level (J) of the current power saving function of said one data storage device 10 and then to perform step S25 through step S28.

If the judgment in step S32 is NO, the controller 12 performs step S20.

In one embodiment, after the controller 12 performs the next monitoring on said one data storage device 10, the controller 12 performs step S20.

With the detailed description of the above preferred embodiments of the invention, it is clear to understand that the data storage system with intelligent power management according to of the invention can achieve the best power management between the data access performance and the reduction of power consumption of the data storage devices.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data storage system with intelligent power management, comprising:
 a plurality of data storage devices, each data storage device being capable of operating in one of (N+1) power saving functions, N being an integer larger than 1, the (N+1) power saving functions sequentially corresponding to from the 0th to the Nth power saving levels; and
 a controller, respectively electrically connected to the plurality of data storage devices, the controller performing the steps of:
  (a) based on a monitoring period, performing a current monitoring on the plurality of data storage devices;
  (b) reading a setting information associated with a main switch and a user-setting power saving level (I), wherein I is an integer index ranging from 0 to N;
  (c) according to the setting information associated with the main switch, judging whether the main switch is turned on;
  (d) if YES in step (c), judging whether the main switch is turned on under a previous monitoring;
  (e) if NO in step (d), reading a current power saving level (J) of a current power saving function of one of the plurality of data storage devices, wherein J is an integer index ranging from 0 to N, the current power saving function is one of the (N+1) power saving functions;
  (f) judging whether J is larger than I;
  (g) if NO in step (f), controlling said one data storage device to operate in said one power saving function corresponding to the Ith power saving level;
  (h) if YES in step (f), controlling said one data storage device to operate in said one power saving function corresponding to the Jth power saving level; and
  (i) based on the monitoring period, performing a next monitoring on said one data storage device.

2. The data storage system with intelligent power management of claim 1, wherein the plurality of data storage devices are specified in a RAID (Redundant Array of Independent Drives) architecture or a JBOD (Just a Bunch Of Disks) architecture.

3. The data storage system with intelligent power management of claim 2, wherein the controller further performing the steps of:
 (j) if NO in step (c), reading the current power saving level (J) of the current power saving function of said one data storage device;
 (k) judging whether J is equal to 0;
 (l) if YES in step (k), preforming step (a); and
 (m) if NO in step (k), controlling said one data storage device to operate in said one power saving function corresponding to the 0th power saving level and preforming step (a).

4. The data storage system with intelligent power management of claim 2, wherein the controller further performing the steps of:
 (n) if YES in step (d), judging whether the monitoring period of the current monitoring is expired;
 (o) if YES in step (n), reading the current power saving level (J) of the current power saving function of said one data storage device and performing step (f) through step (i); and
 (p) if NO in step (n), performing step (a).

5. The data storage system with intelligent power management of claim 2, wherein after the controller performs the next monitoring on said one data storage device, the controller performs step (a).

* * * * *